(12) United States Patent
Kelly

(10) Patent No.: US 12,390,740 B1
(45) Date of Patent: Aug. 19, 2025

(54) FEMALE-THEMED VIDEO GAME SYSTEM

(71) Applicant: Travis Kelly, Augusta, GA (US)

(72) Inventor: Travis Kelly, Augusta, GA (US)

( * ) Notice: Subject to any disclaimer, the term of this patent is extended or adjusted under 35 U.S.C. 154(b) by 317 days.

(21) Appl. No.: 18/097,547

(22) Filed: Jan. 17, 2023

(51) Int. Cl.
| | |
|---|---|
| *A63F 13/90* | (2014.01) |
| *A63F 13/211* | (2014.01) |
| *A63F 13/213* | (2014.01) |
| *A63F 13/216* | (2014.01) |
| *A63F 13/25* | (2014.01) |
| *A63F 13/332* | (2014.01) |
| *A63F 13/70* | (2014.01) |

(52) U.S. Cl.
CPC ............ *A63F 13/90* (2014.09); *A63F 13/211* (2014.09); *A63F 13/213* (2014.09); *A63F 13/216* (2014.09); *A63F 13/25* (2014.09); *A63F 13/332* (2014.09); *A63F 13/70* (2014.09)

(58) Field of Classification Search
None
See application file for complete search history.

(56) References Cited

U.S. PATENT DOCUMENTS

| | | | |
|---|---|---|---|
| 5,488,362 A | 1/1996 | Ullman | |
| 8,613,672 B2 | 12/2013 | Mae | |
| 9,227,137 B2 | 1/2016 | Grant | |
| 9,333,423 B2* | 5/2016 | Mercier | A63F 13/32 |
| 9,408,447 B1 | 8/2016 | Divinity | |
| 9,992,574 B2* | 6/2018 | Esses | H04R 3/12 |
| 10,206,475 B2* | 2/2019 | Pusey | A45C 15/02 |
| D848,532 S | 5/2019 | Kuoch | |
| 2002/0088726 A1* | 7/2002 | Chou | A45F 3/04 |
| | | | 206/320 |
| 2005/0176508 A1* | 8/2005 | Chastain | B60R 11/02 |
| | | | 463/46 |
| 2005/0185916 A1* | 8/2005 | Jost | G11B 33/025 |
| 2005/0250583 A1* | 11/2005 | White | A63F 13/98 |
| | | | 463/47 |
| 2010/0081503 A1 | 4/2010 | Johnson | |
| 2011/0092294 A1* | 4/2011 | Mercier | A63F 13/90 |
| | | | 463/46 |
| 2012/0238360 A1 | 9/2012 | Pirogov | |
| 2014/0274204 A1* | 9/2014 | Williams | H02J 7/0013 |
| | | | 455/556.1 |
| 2018/0303213 A1* | 10/2018 | Pusey | A45C 13/002 |
| 2018/0310698 A1* | 11/2018 | Rao | A45F 3/04 |

* cited by examiner

*Primary Examiner* — Seng H Lim
(74) *Attorney, Agent, or Firm* — Kyle A. Fletcher, Esq.

(57) ABSTRACT

The female-themed video game system is a luggage item. The female-themed video game system incorporates a purse structure and a control circuit. The purse structure contains the control circuit. The control circuit is an electric circuit. The control circuit performs a security function that monitors the environment surrounding a client using the female-themed video game system. The female-themed video game system further performs an entertainment function for the client.

12 Claims, 6 Drawing Sheets

FEMALE-THEMED VIDEO GAME SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of details of purses, luggage, or bags not provided for in other groups. (A45C13/00)

Summary of Invention

The female-themed video game system is a luggage item. The female-themed video game system comprises a purse structure and a control circuit. The purse structure contains the control circuit. The control circuit is an electric circuit. The control circuit performs a security function that monitors the environment surrounding a client using the female-themed video game system. The female-themed video game system further performs an entertainment function for the client.

These together with additional objects, features and advantages of the female-themed video game system will be readily apparent to those of ordinary skill in the art upon reading the following detailed description of the presently preferred, but nonetheless illustrative, embodiments when taken in conjunction with the accompanying drawings.

In this respect, before explaining the current embodiments of the female-themed video game system in detail, it is to be understood that the female-themed video game system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the female-themed video game system.

It is therefore important that the claims be regarded as including such equivalent construction insofar as they do not depart from the spirit and scope of the female-themed video game system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
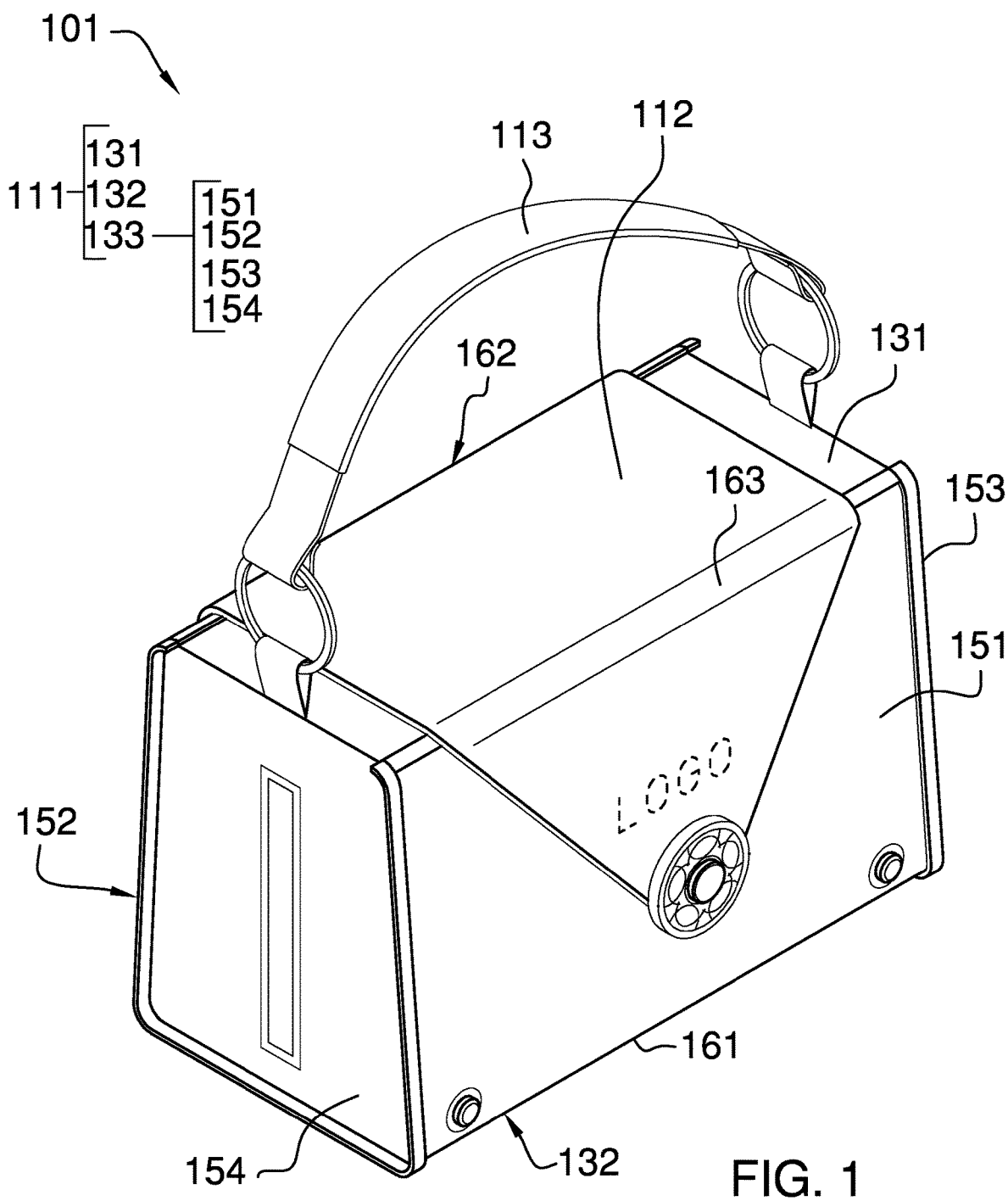
FIG. 1 is a perspective view of an embodiment of the disclosure.
Figure 2:
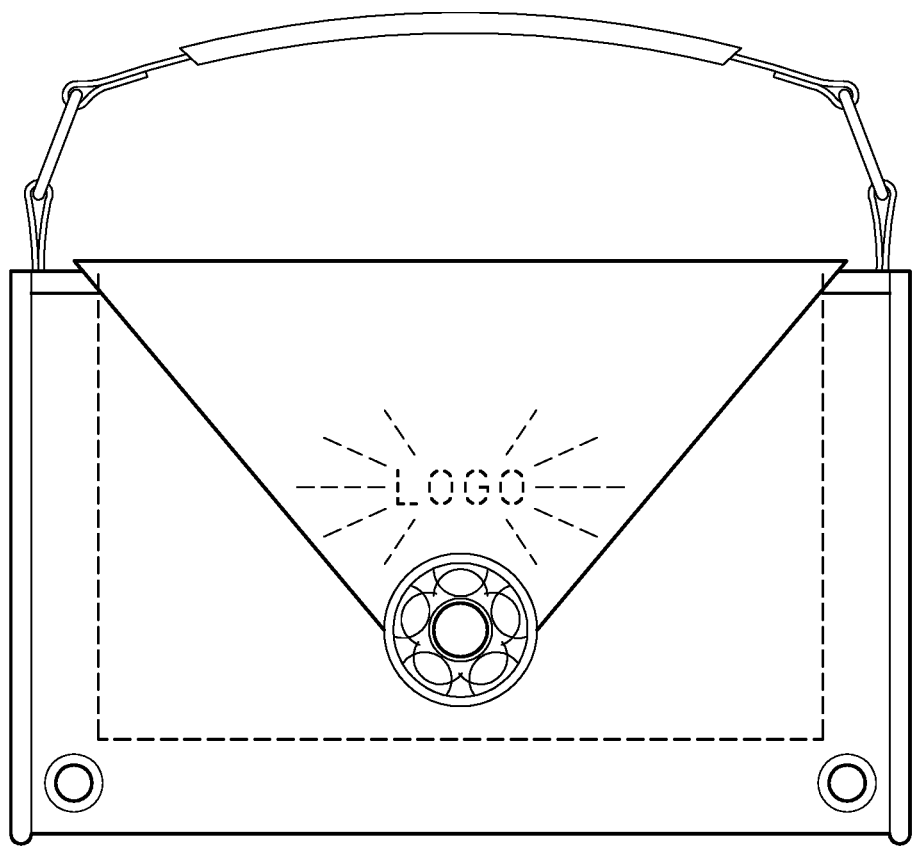
FIG. 2 is a front view of an embodiment of the disclosure.
Figure 3:
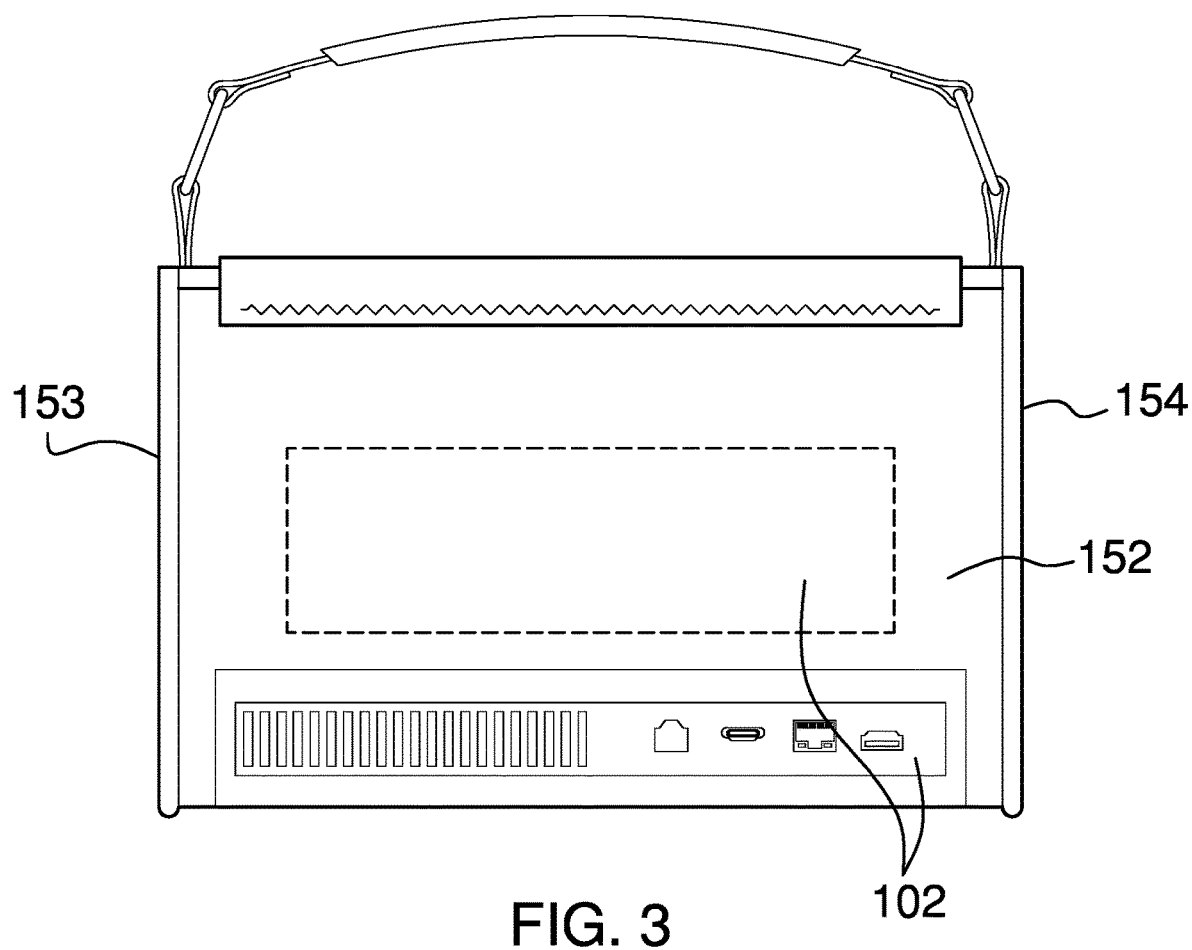
FIG. 3 is a top view of an embodiment of the disclosure.
Figure 4:
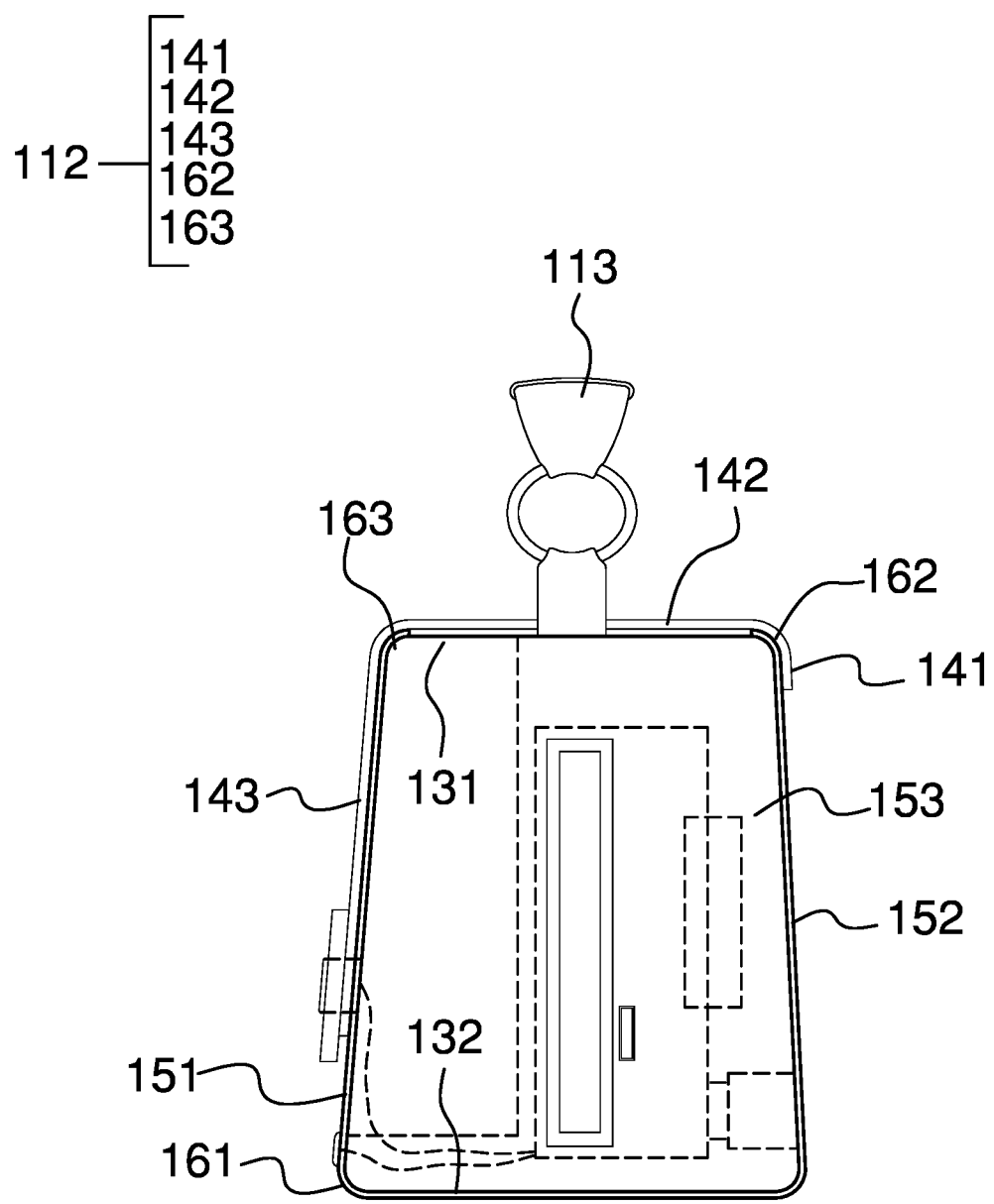
FIG. 4 is a side view of an embodiment of the disclosure.
Figure 5:
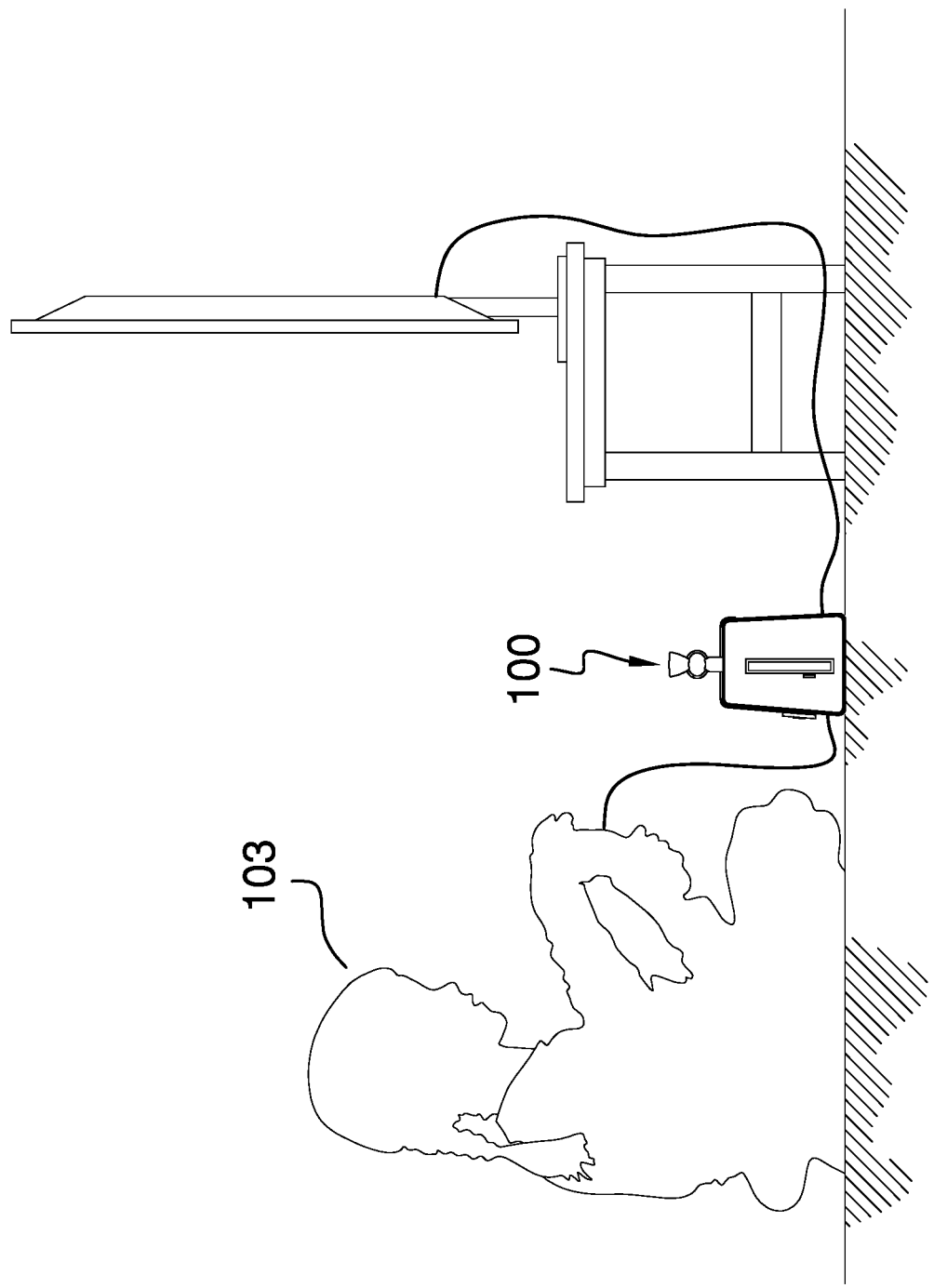
FIG. 5 is an in-use view of an embodiment of the disclosure.
Figure 6:
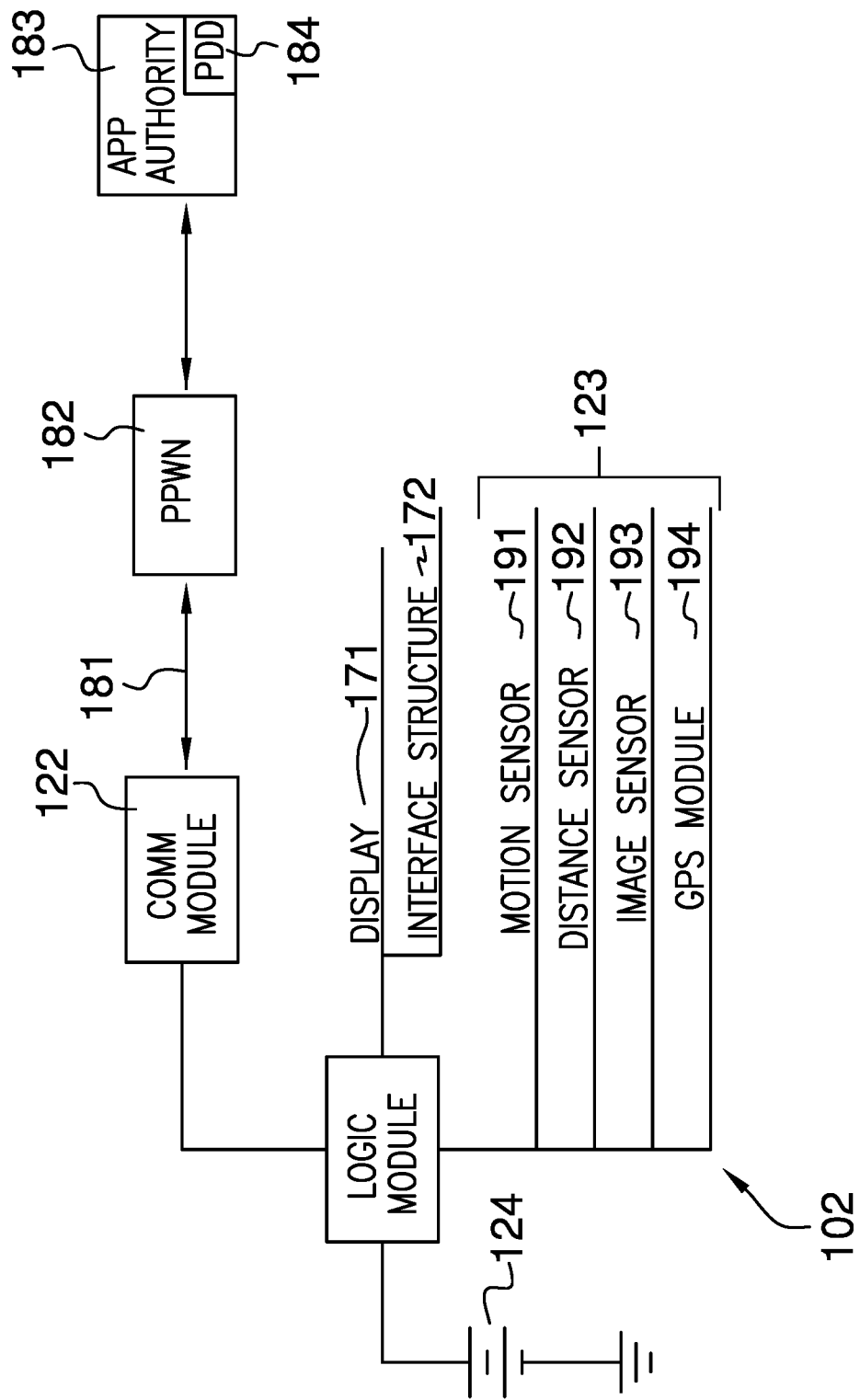
FIG. 6 is a schematic view of an embodiment of the disclosure.

Detailed reference will now be made to one or more potential embodiments of the disclosure, which are illustrated in FIGS. 1 through 6.

The female-themed video game system 100 (hereinafter invention) is a luggage item. The invention 100 comprises a purse structure 101 and a control circuit 102. The purse structure 101 contains the control circuit 102. The control circuit 102 is an electric circuit. The control circuit 102 performs a security function that monitors the environment surrounding a client 103 using the invention 100. The invention 100 further performs an entertainment function for the client 103. The client 103 is defined elsewhere in this disclosure.

The purse structure 101 is a domestic article. The purse structure 101 is a luggage item. The purse structure 101 is a hand carried item. The purse structure 101 forms a container that stores the control circuit 102. The purse structure 101 comprises a pan structure 111, a lid structure 112, and a handle 113.

The pan structure 111 forms the containment space of the purse structure 101. The pan structure 111 is a prism structure. The pan structure 111 has a pan shape. The pan structure 111 forms a protected space that contains the control circuit 102. The pan structure 111 is formed to allow for the use of the control circuit 102 while the control circuit 102 remains in the purse structure 101. The pan structure 111 comprises a superior face 131, an inferior face 132, and a plurality of lateral faces 133.

The superior face 131 is the open face of the pan shape of the pan structure 111. The superior face 131 forms the superior surface of the pan structure 111. The inferior face 132 is a closed face of the pan shape of the pan structure 111. The inferior face 132 is the face of the pan structure 111 that is distal from the inferior face 132. The inferior face 132 forms the face of the pan structure 111 that rests on a supporting surface. The superior face 131 and the inferior face 132 are horizontally oriented structures.

Each lateral face selected from the plurality of lateral faces 133 is a disk shaped structure. The plurality of lateral faces 133 form the vertically oriented boundaries of the protected space formed by the pan structure 111. The plurality of lateral faces 133 further comprises an anterior face 151, a posterior face 152, a left lateral face 153, and a right lateral face 154.

The anterior face 151 is a disk shaped structure. The anterior face 151 forms the anterior surface of the pan shape of the pan structure 111. The anterior face 151 is located between the left lateral face 153 and the right lateral face 154. The anterior face 151 attaches to the inferior face 132 such that the anterior face 151 rotates relative to the inferior face 132. The anterior face 151 rotates between a closed position and an open position. The anterior face 151 provides access to the entertainment functions of the control circuit 102 when the anterior face 151 rotates into the open position. The anterior face 151 further comprises a first living hinge 161. The first living hinge 161 is a living hinge. The living hinge is defined elsewhere in this disclosure. The first living hinge 161 secures the anterior face 151 to the inferior face 132 such that the anterior face 151 rotates relative to the inferior face 132.

The posterior face 152 is a disk shaped structure. The posterior face 152 forms the anterior surface of the pan shape of the pan structure 111. The posterior face 152 permanently attaches to the inferior face 132, the left lateral face 153, and the right lateral face 154. The left lateral face 153 is a disk shaped structure. The left lateral face 153 forms the anterior surface of the pan shape of the pan structure 111. The left lateral face 153 permanently attaches to the inferior face 132 and the posterior face 152. The right lateral face 154 is a disk shaped structure. The right lateral face 154 forms the anterior surface of the pan shape of the pan structure 111. The right lateral face 154 permanently attaches to the inferior face 132 and the posterior face 152.

The lid structure 112 is a barrier structure. The lid structure 112 provides access into the protected space formed by the pan structure 111. The lid structure 112 is a rotating structure. The lid structure 112 rotates between a closed position and an open position. The lid structure 112 permanently attaches to the posterior face 152 of the pan structure 111. The lid structure 112 encloses the superior face 131 of the pan structure 111 in the closed position. The lid structure 112 removably attaches to the anterior face 151 of the pan structure 111. The lid structure 112 further comprises a posterior panel 141, a superior panel 142, an anterior panel 143, a second living hinge 162, and a third living hinge 163.

The posterior panel 141 is a disk shaped structure. The posterior panel 141 forms the portion of the lid structure 112 that permanently attaches to the posterior face 152 of the pan structure 111. The posterior panel 141 is a disk shaped structure. The superior panel 142 forms the portion of the lid structure 112 that encloses the superior face 131 of the pan structure 111. The superior panel 142 attaches to the posterior panel 141 such that the superior panel 142 rotates relative to the posterior panel 141. The anterior panel 143 is a disk shaped structure. The anterior panel 143 forms the portion of the lid structure 112 that detachably attaches to the anterior panel 143 of the pan structure 111. The anterior panel 143 attaches to the superior panel 142 such that the anterior panel 143 rotates relative to the superior panel 142.

The second living hinge 162 is a living hinge. The living hinge is defined elsewhere in this disclosure. The second living hinge 162 secures the superior panel 142 to the posterior panel 141 such that the superior panel 142 rotates relative to the posterior panel 141. The third living hinge 163 is a living hinge. The living hinge is defined elsewhere in this disclosure. The third living hinge 163 secures the anterior panel 143 to the superior panel 142 such that the anterior panel 143 rotates relative to the superior panel 142.

The handle 113 is a grip that mounts on the superior panel 142 of the lid structure 112. The handle 113 is used to carry the purse structure 101 when the pan structure 111 is in a closed position.

The control circuit 102 is an electric circuit. The control circuit 102 senses the environment surrounding the purse structure 101. The control circuit 102 transmits a message facility to an appropriate authority 183 when a potentially hazardous situation is detected in the environment surrounding the purse structure 101. The control circuit 102 comprises a logic module 121, a communication module 122, a plurality of safety sensors 123, and a power circuit 124. The logic module 121, the communication module 122, the plurality of safety sensors 123, and the power circuit 124 are electrically interconnected.

The logic module 121 is a readily and commercially available programmable electronic device that is used to manage, regulate, and operate the control circuit 102. The communication module 122 is a wireless electronic communication device that allows the logic module 121 to wirelessly communicate with an appropriate authority 183. The communication module 122 further comprises a wireless communication link 181, a commercially provided and publicly available cellular wireless network 182, a personal data device 184, and the appropriate authority 183. The communication module 122 forms the wireless communication link 181 with the commercially provided and publicly available cellular wireless network 182. The commercially provided and publicly available cellular wireless network 182 establishes a communication link with the appropriate authority 183 through the personal data device 184. The communication module 122 exchanges one or more direct messaging facilities that are transmitted over the wireless communication link 181 to the appropriate authority 183. The message contained in the direct messaging facility contains: a) the GPS coordinates of the GPS module 194; b) a summary of the data collected by the motion sensor 191; c) a summary of the data collected from the distance sensor 192; and, d) the image data collected from the image sensor 193.

In the first potential embodiment of the disclosure, the communication module 122 communicates the direct messaging facilities as SMS and MMS messages between the logic module 121 and the personal data device 184 through the commercially provided and publicly available cellular wireless network 182. The use of a commercially provided and publicly available cellular wireless network is preferred because: a) of its low cost; b) of the widespread availability and the broad interoperability between competing commercially provided and publicly available cellular wireless networks; and, c) methods and techniques to send SMS and MMS messages over a commercially provided and publicly available cellular wireless network are well known and documented by those skilled in the electrical arts.

The GPS module 194 is an electrical device that communicates with the GPS to determine the GPS coordinates of the GPS module 194. When queried by the logic module 121, the GPS module 194 transfers the GPS coordinates to the logic module 121. The logic module 121 includes the GPS coordinates of the GPS module 194 with any messaging facility generated by the logic module 121. The logic module 121 includes the GPS coordinates in any messaging facility that is transmitted to the appropriate authority 183.

The personal data device 184 is a programmable electrical device. The personal data device 184 further comprises an application. The personal data device 184 provides data management and communication services through one or more functions referred to as an application.

The logic module 121 further comprises a display device 171 and an interface structure 172. The display device 171 is an electric device. The display device 171 electrically connects to the logic module 121. The logic module 121 controls the operation of the display device 171. The logic module 121 with the image that is displayed by the display device 171. The image displayed by the display device 171 presents indicia that are is intended to stimulate a sentiment in the client 103. The display device 171 is defined elsewhere in this disclosure. The interface structure 172 is an electrical device. The display device 171 electrically connects to the logic module 121. The logic module 121 monitors the operation of the display device 171. The interface structure 172 provides an interface that allows the client 103 to the control the operation of the entertainment functionality provided by the control circuit 102.

The plurality of safety sensors 123 forms the safety structure of the control circuit 102. Each safety sensor selected from the plurality of safety sensors 123 measures the environment surrounding the purse structure 101. Each safety sensor selected from the plurality of safety sensors 123 electrically connects to the logic module 121. Each safety sensor selected from the plurality of safety sensors 123 communicates information gathered from the environment surrounding the purse structure 101. The plurality of safety sensors 123 senses motion in the environment surrounding the purse structure 101. The plurality of safety sensors 123 measures the distance between the sensed motion and the purse structure 101. The plurality of safety sensors 123 captures a plurality of images of the environment surrounding the purse structure 101. The plurality of safety sensors 123 further comprises a motion sensor 191, a distance sensor 192, an image sensor 193, and a GPS module 194.

The motion sensor 191 is a sensor. The motion sensor 191 is defined elsewhere in this disclosure. The motion sensor 191 detects motion in the environment surrounding the purse structure 101. The motion sensor 191 transmits information regarding the detected motion to the logic module 121. The logic module 121 monitors the motion sensor 191 and prepares a messaging facility for the appropriate authority 183 when potentially hazardous motion is detected.

The distance sensor 192 is a sensor. The distance sensor 192 is defined elsewhere in this disclosure. The distance sensor 192 detects the distance of objects within the environment surrounding the purse structure 101. The distance sensor 192 transmits information regarding the detected distance of objects to the logic module 121. The logic module 121 monitors the distance sensor 192 and prepares a messaging facility for the appropriate authority 183 when an object is detected that is too close to the purse structure 101.

The image sensor 193 is a sensor. The image sensor 193 is defined elsewhere in this disclosure. The image sensor 193 captures electromagnetic radiation that is in the environment surrounding the purse structure 101. The image sensor 193 transmits information regarding the captured electromagnetic to the logic module 121. The logic module 121 includes the information received from the image sensor 193 in any messaging facility that is transmitted to the appropriate authority 183.

The power circuit 124 is an electrochemical structure. The power circuit 124 stores energy in the form of chemical potential energy. The power circuit 124 converts the stored chemical energy into electric energy. The power circuit 124 transmits the converted electric energy to the logic module 121, the communication module 122, and the plurality of safety sensors 123 to power the operation of the control circuit 102.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Announce: As used in this disclosure, to announce means to generate audible sounds over a transducer.

Anterior: As used in this disclosure, anterior is a term that is used to refer to the front side or direction of a structure. When comparing two objects, the anterior object is the object that is closer to the front of the structure.

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to send and receive alarm or other notification messages regarding a monitored system or activity.

Audio-Visual Display: As used in this disclosure, an audio-visual display is a display device that further comprises a speaker such that the audio-visual display simultaneously presents visual and audible information in a coordinated manner.

Barrier: As used in this disclosure, a barrier is a physical obstacle that forms a boundary between a first space and a second space. The barrier prevents the passage of an object between the first space and the second space.

Bluetooth™: As used in this disclosure, Bluetooth™ is a standardized communication protocol that is used to wirelessly interconnect electronic devices.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Client: As used in this disclosure, a client is an individual who is designated to receive the services of the disclosure at bar.

Closed Position: As used in this disclosure, a closed position refers to a movable barrier structure that is in an orientation that prevents passage through a port or an aperture. The closed position is often referred to as an object being "closed."

Commercially Provided And Publicly Available Cellular Wireless Network: As used in this disclosure, a commercially provided and publicly available cellular wireless network refers to subscription based publicly available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container. Use protected space or protection space.

Coronal Direction: As used in this disclosure, the coronal direction (or axis) is a direction defined by the axis of an object that is perpendicular in the transverse (posterior to anterior) direction and the sagittal (superior to inferior) direction. The coronal direction is the direction that moves from a first lateral side of the object to the second lateral side of the object (Stated less formally: the direction from the left to the right).

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Distance Sensor: As used in this disclosure, a distance sensor is an electrical sensing device that detects the presence and distance of an object within the field of view of the distance sensor.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Flexure Bearing: As used in this disclosure, a flexure bearing is a thin and flexible material that is used to attach, or bind, a first object to a second object such that the first object can rotate in a controlled direction relative to the second object.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term roughly geometrically similar is meant that the primary shapes of two objects are geometrically similar except that there are functional items (such as fastening devices) associated with the primary shape may not maintain the ratio for geometric similarity.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone. See indicia sentiment optical character recognition. See Label and Pattern.

Image Sensor: As used in this disclosure, an image sensor detects electromagnetic light from the exterior of the image sensor and converts the detected electromagnetic radiation into a digital representation of sufficient detail to allow a logic module to create and display a visual reproduction of the source of the captured electromagnetic radiation.

Indicia: As used in this disclosure, the term indicia refers to a set of markings that identify a sentiment. See sentiment.

Inferior: As used in this disclosure, the term inferior refers to a directional reference that is parallel to and in the same direction as the force of gravity when an object is positioned or used normally.

Interface: As used in this disclosure, an interface is a physical or virtual boundary that separates two different systems and across which information is exchanged.

Interior: As used in this disclosure, the interior is used as a relational term that implies that an object is contained within the boundary of a structure or a space.

Lateral: As used in this disclosure, the term lateral refers to an axis of an object that is perpendicular in the transverse (posterior to anterior) direction and the sagittal (superior to inferior) direction. The distal surfaces of an object that intersect the lateral axis are often informally referred to as the "sides" of the object. The lateral axis is usually perpendicular to the primary sense of direction of the object. A lateral face refers to the surfaces of a prism structure that run between the congruent ends of the prism. Movement in a lateral direction is often called "sideways" movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Living Hinge: As used in this disclosure, a living hinge refers to a single object that is formed out of flexible material that is divided into a first segment, a second segment and the living hinge. The flexible nature of the flexible material allows the living hinge to be flexed in the manner of a hinge allowing the first segment to rotate relative to the second hinge. The living hinge is a form of a flexure bearing. A material that is formed with a series of parallel living hinges is referred to as a kerf bending. A kerf bending formed in a plate allows the plate to be bent into a curved shape.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but is not limited to, postal delivery. Examples of a direct messaging facilities include, but are not limited to, email, audio based communications, and SMS messages. A social media service is an example of a broadcast messaging facility.

Microphone: As used in this disclosure, a microphone is a transducer that converts the energy from vibration into electrical energy. The sources of vibrations include, but are not limited to, acoustic energy.

Motion Sensor: As used in this disclosure, a motion sensor refers to a commercially available sensor that generates an electrical signal should the motion sensor detect movement within its field of view. Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

PDD: As used in this disclosure, PDD is an acronym for personal data device.

Pedestal: As used in this disclosure, a pedestal is an intermediary load bearing structure that forms a load path between a supporting surface and an object, structure, or other load path.

Personal Data Device: As used in this disclosure, a personal data device is a handheld logical device that is used for managing personal information and communication. Examples of personal data device include, but are not limited to, cellular phones, tablets, and smartphones.

Perimeter: As used in this disclosure, a perimeter is one or more curved or straight lines that bounds an enclosed area on a plane or surface. The perimeter of a circle is commonly referred to as a circumference.

Posterior: As used in this disclosure, posterior is a term that is used to refer to the side of an object that is distal or in the opposite direction of the anterior side. When comparing two items, the posterior item is the item that is distal from the anterior of the object.

PPWN: As used in this disclosure, the PPWN is an acronym for publicly provided wireless network. The PPWN refers to a commercially provided and publicly available cellular wireless network.

Present: As used in this disclosure, to present means to bring an object, image, or concept to the attention of an individual.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder. Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Sagittal Direction: As used in this disclosure, the sagittal direction runs from the superior surface to the inferior surface of an object and is perpendicular to the coronal direction and the transverse direction.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Sentiment: As used in this disclosure, a sentiment refers to a symbolic meaning or message that is communicated through the use of an object or an image, potentially including a text based image. See image and optical character recognition.

Speaker: As used in this disclosure, a speaker is an electrical transducer that converts an electrical signal into an audible sound.

Subscription: As used in this disclosure, a subscription refers to a contractual arrangement for the delivery of a product or access to a service on a recurring basis. The subscribed product or service can be provided on a continuous basis or on a scheduled basis. The term subscription often implies that the subscribed product or service has been paid for in advance.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Transducer: As used in this disclosure, a transducer is a device that converts a physical quantity, such as pressure or brightness into an electrical signal or a device that converts an electrical signal into a physical quantity.

Transverse Direction: As used in this disclosure, the transverse direction runs from the anterior surface to the posterior surface of an object and is perpendicular to the coronal direction and the sagittal direction.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Video: As used in this disclosure, video refers to the display of: a) an image; or, b) a plurality of images in a manner that simulates the perception of motion for a person viewing the video. This disclosure assumes that a video device can further incorporate sounds associated with the generated images.

Video Device: As used in this disclosure, a video device is a device that generates an image on a display. The image may be a still or moving image.

Video File: As used in this disclosure, a video file is a digital representation of an image and associated audible sounds to store an image. Separate hardware is used to convert the digital representation of the sound into an audible sound.

Video Source: As used in this disclosure, a video source is a device that generates electrical signals that can be converted into an image by a display.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A female-themed video game system comprising
a purse structure and a control circuit;
wherein the purse structure contains the control circuit;
wherein the female-themed video game system is a luggage item;
wherein the control circuit is an electric circuit;
wherein the control circuit performs a security function that monitors the environment surrounding a client using the female-themed video game system;
wherein the female-themed video game system further performs an entertainment function for the client;
wherein the control circuit senses the environment surrounding the purse structure, and is adapted to enhance the experience of the entertainment function for the client when playing a video game;
wherein the control circuit comprises a logic module, a communication module, a plurality of safety sensors, and a power circuit;
wherein the plurality of safety sensors further comprises a motion sensor, a distance sensor, an image sensor, and a GPS module;
wherein the motion sensor detects motion in the environment surrounding the purse structure;
wherein the motion sensor transmits information regarding the detected motion to the logic module;
wherein the logic module is adapted to monitor the motion sensor and utilizes the output of the motion sensor when the client is playing the video game;
wherein the distance sensor detects the distance of objects within the environment surrounding the purse structure;
wherein the distance sensor transmits information regarding the detected distance of objects to the logic module;
wherein the logic module is adapted to monitor the distance sensor for an object that is detected and utilizes the output of the distance sensor when the client is playing the video game;
wherein the image sensor captures electromagnetic radiation that is in the environment surrounding the purse structure;
wherein the image sensor transmits information regarding the captured electromagnetic to the logic module, which is adapted to be used to enhance the experience of the client who is playing the video game;
wherein the GPS module is an electrical device that communicates with the GPS to determine the GPS coordinates of the GPS module;
wherein when queried by the logic module, the GPS module transfers the GPS coordinates to the logic module;
wherein the logic module includes the GPS coordinates of the GPS module and is adapted to utilize this information when the client is playing the video game.

2. The female-themed video game system according to claim 1
wherein the purse structure is a domestic article;
wherein the purse structure is a luggage item;
wherein the purse structure is a hand carried item;

wherein the purse structure forms a container that stores the control circuit.

3. The female-themed video game system according to claim 2
wherein the purse structure comprises a pan structure, a lid structure, and a handle;
wherein the lid structure and the handle attach to the lid structure;
wherein the pan structure forms a protected space that contains the control circuit.

4. The female-themed video game system according to claim 3
wherein the pan structure forms the containment space of the purse structure;
wherein the pan structure has a pan shape.

5. The female-themed video game system according to claim 4
wherein the logic module, the communication module, the plurality of safety sensors, and the power circuit are electrically interconnected.

6. The female-themed video game system according to claim 5
wherein the pan structure comprises a superior face, an inferior face, and a plurality of lateral faces;
wherein the superior face is the open face of the pan shape of the pan structure;
wherein the superior face forms the superior surface of the pan structure;
wherein the inferior face is a closed face of the pan shape of the pan structure;
wherein the inferior face is the face of the pan structure that is distal from the inferior face;
wherein the inferior face forms the face of the pan structure that rests on a supporting surface;
wherein the superior face and the inferior face are horizontally oriented structures;
wherein each lateral face selected from the plurality of lateral faces is a disk shaped structure;
wherein the plurality of lateral faces form the vertically oriented boundaries of the protected space formed by the pan structure.

7. The female-themed video game system according to claim 6
wherein the plurality of lateral faces further comprises an anterior face, a posterior face, a left lateral face, and a right lateral face;
wherein the anterior face is a disk shaped structure;
wherein the anterior face forms the anterior surface of the pan shape of the pan structure;
wherein the anterior face is located between the left lateral face and the right lateral face;
wherein the anterior face attaches to the inferior face such that the anterior face rotates relative to the inferior face;
wherein the anterior face rotates between a closed position and an open position;
wherein the anterior face provides access to the entertainment functions of the control circuit when the anterior face rotates into the open position;
wherein the anterior face further comprises a first living hinge;
wherein the first living hinge is a living hinge;
wherein the first living hinge secures the anterior face to the inferior face such that the anterior face rotates relative to the inferior face;
wherein the posterior face is a disk shaped structure;
wherein the posterior face forms the anterior surface of the pan shape of the pan structure;
wherein the posterior face permanently attaches to the inferior face, the left lateral face, and the right lateral face;
wherein the left lateral face is a disk shaped structure;
wherein the left lateral face forms the anterior surface of the pan shape of the pan structure;
wherein the left lateral face permanently attaches to the inferior face and the posterior face;
wherein the right lateral face is a disk shaped structure;
wherein the right lateral face forms the anterior surface of the pan shape of the pan structure;
wherein the right lateral face permanently attaches to the inferior face and the posterior face.

8. The female-themed video game system according to claim 7
wherein the lid structure is a barrier structure;
wherein the lid structure provides access into the protected space formed by the pan structure;
wherein the lid structure is a rotating structure;
wherein the lid structure rotates between a closed position and an open position;
wherein the lid structure permanently attaches to the posterior face of the pan structure;
wherein the lid structure encloses the superior face of the pan structure in the closed position;
wherein the lid structure removably attaches to the anterior face of the pan structure.

9. The female-themed video game system according to claim 8
wherein the lid structure further comprises a posterior panel, a superior panel, an anterior panel, a second living hinge, and a third living hinge;
wherein the posterior panel is a disk shaped structure;
wherein the posterior panel forms the portion of the lid structure that permanently attaches to the posterior face of the pan structure;
wherein the posterior panel is a disk shaped structure;
wherein the superior panel forms the portion of the lid structure that encloses the superior face of the pan structure;
wherein the superior panel attaches to the posterior panel such that the superior panel rotates relative to the posterior panel;
wherein the anterior panel is a disk shaped structure;
wherein the anterior panel forms the portion of the lid structure that detachably attaches to the anterior panel of the pan structure;
wherein the anterior panel attaches to the superior panel such that the anterior panel rotates relative to the superior panel;
wherein the second living hinge is a living hinge;
wherein the second living hinge secures the superior panel to the posterior panel such that the superior panel rotates relative to the posterior panel;
wherein the third living hinge is a living hinge;
wherein the third living hinge secures the anterior panel to the superior panel such that the anterior panel rotates relative to the superior panel.

10. The female-themed video game system according to claim 9
wherein the logic module is a programmable electronic device; wherein the communication module is a wireless electronic communication device that allows the logic module to wirelessly communicate with the appropriate authority; wherein the communication module further comprises a wireless communication link, and a commercially provided and publicly available cellular wireless network;

wherein the communication module forms the wireless communication link with the commercially provided and publicly available cellular wireless network;

wherein the commercially provided and publicly available cellular wireless network establishes a communication link with the appropriate authority through the personal data device; wherein the communication module exchanges one or more direct messaging facilities that are transmitted over the wireless communication link to the appropriate authority.

11. The female-themed video game system according to claim 10 wherein the logic module further comprises a display device and an interface structure;

wherein the display device is an electric device;

wherein the display device electrically connects to the logic module;

wherein the logic module controls the operation of the display device;

wherein the logic module with the image that is displayed by the display device;

wherein the interface structure is an electrical device;

wherein the display device electrically connects to the logic module;

wherein the logic module monitors the operation of the display device;

wherein the interface structure provides an interface that allows the client to the control the operation of the entertainment functionality provided by the control circuit.

12. The female-themed video game system according to claim 11 wherein the plurality of safety sensors forms the safety structure of the control circuit;

wherein each safety sensor selected from the plurality of safety sensors measures the environment surrounding the purse structure;

wherein each safety sensor selected from the plurality of safety sensors electrically connects to the logic module;

wherein each safety sensor selected from the plurality of safety sensors communicates information gathered from the environment surrounding the purse structure;

wherein the plurality of safety sensors senses motion in the environment surrounding the purse structure;

wherein the plurality of safety sensors measures the distance between the sensed motion and the purse structure;

wherein the plurality of safety sensors captures a plurality of images of the environment surrounding the purse structure.

* * * * *